(12) United States Patent
Scharfe et al.

(10) Patent No.: US 8,980,960 B2
(45) Date of Patent: *Mar. 17, 2015

(54) METHODS FOR PRODUCING A DISPERSION CONTAINING SILICON DIOXIDE PARTICLES AND CATIONIZATION AGENT

(75) Inventors: Stefan Scharfe, Erlensee (DE); Andrea Heuschen, Floersbachtal (DE); Christoph Batz-Sohn, Morris Plains, NJ (US); Burkhard Standke, Loerrach (DE); Christian Wassmer, Hausen (DE); Heinz Lach, Rodenbach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/642,862

(22) PCT Filed: May 23, 2011

(86) PCT No.: PCT/EP2011/058342
§ 371 (c)(1),
(2), (4) Date: Oct. 23, 2012

(87) PCT Pub. No.: WO2012/004044
PCT Pub. Date: Jan. 12, 2012

(65) Prior Publication Data
US 2013/0040078 A1    Feb. 14, 2013

(30) Foreign Application Priority Data
Jul. 9, 2010 (DE) .......................... 10 2010 031 184

(51) Int. Cl.
*C01B 33/141* (2006.01)
*C09C 1/28* (2006.01)
*D21H 19/40* (2006.01)
*B41M 5/52* (2006.01)
*B41M 5/42* (2006.01)

(52) U.S. Cl.
CPC ............ *B41M 5/5218* (2013.01); *C01B 33/141* (2013.01); *D21H 19/40* (2013.01); *B41M 5/426* (2013.01)
USPC ...................... 516/87; 106/287.1; 106/287.11; 106/287.12; 106/287.14; 106/482; 106/490; 106/491

(58) Field of Classification Search
CPC .. C01B 33/141; C01B 33/146; C01B 33/149; C09C 1/3063; C09C 1/28; C09C 1/30; C09C 3/12; B41M 5/5218; B41M 5/426
USPC ............... 516/87; 106/287.1, 287.11, 287.12, 106/287.14, 482, 490, 491
See application file for complete search history.

(56) References Cited

U.S. PATENT DOCUMENTS

| 3,235,509 | A | * | 2/1966 | Nitzsche et al. ............... 516/117 |
| 4,123,383 | A | * | 10/1978 | Ihde, Jr. ......................... 516/117 |
| 5,051,129 | A | * | 9/1991 | Cuthbert et al. ........... 106/287.11 |
| 5,069,816 | A | * | 12/1991 | DeSantis et al. .............. 516/111 |
| 5,073,195 | A | * | 12/1991 | Cuthbert et al. ........... 106/287.11 |
| 5,073,298 | A | * | 12/1991 | Gentle et al. ................... 516/117 |
| 5,169,561 | A | * | 12/1992 | Gentle et al. ................... 516/119 |
| 5,300,327 | A |   | 4/1994 | Stark-Kasley et al. ........ 427/387 |
| 5,411,585 | A | * | 5/1995 | Avery et al. ................. 106/287.1 |
| 5,674,937 | A |   | 10/1997 | Berg et al. |
| 6,228,475 | B1 |   | 5/2001 | Chu et al. |
| 6,641,870 | B2 |   | 11/2003 | Bartkowiak et al. |

(Continued)

FOREIGN PATENT DOCUMENTS

| CN | 1771196 A | 5/2006 |
| EP | 0 983 867 | 3/2000 |

(Continued)

OTHER PUBLICATIONS

Jesionowski, et al., "Comparison of the techniques used to modify amorphous hydrated silicas," Journal of Non-Crystalline Solids, vol. 277, pp. 45 to 57, (2000).
International Search Report Issued Dec. 14, 2011 on PCT/EP11/58342 Filed May 23, 2011.

*Primary Examiner* — Daniel S Metzmaier
(74) *Attorney, Agent, or Firm* — Oblon, McClelland, Maier & Neustadt, L.L.P.

(57) ABSTRACT

Process for preparing a dispersion comprising silicon dioxide particles and cationizing agents, by dispersing 50 to 75 parts by weight of water, 25 to 50 parts by weight of silicon dioxide particles having a BET surface area of 30 to 500 m²/g and 100 to 300 μg of cationizing agent per square meter of the BET surface area of the silicon dioxide particles, wherein the cationizing agent is obtainable by reacting at least one haloalkylfunctional alkoxysilane, hydrolysis products, condensation products and/or mixtures thereof with at least one aminoalcohol and water; and optionally removing the resulting hydrolysis alcohol from the reaction mixture. Also the process for preparing the dispersion, wherein the cationizing agent comprises one or more quaternary, aminoalcohol-functional, organosilicon compounds of formula III and/or condensation products thereof, wherein Ru and Rv are independently $C_{2-4}$ alkyl group, m is 2-5 and n is 2-5.

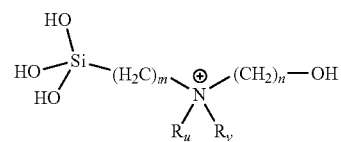

III

19 Claims, No Drawings

(56) References Cited

U.S. PATENT DOCUMENTS

| | | |
|---|---|---|
| 7,834,073 B2 | 11/2010 | Standke et al. |
| 8,101,682 B2 | 1/2012 | Standke |
| 8,298,679 B2 | 10/2012 | Albert et al. |
| 8,747,541 B2 * | 6/2014 | Scharfe et al. ............ 106/287.11 |
| 2002/0008011 A1 | 1/2002 | Sonnenschein et al. |
| 2004/0081772 A1 | 4/2004 | Wickramanayake |
| 2005/0147770 A1 | 7/2005 | Wickramanayake |
| 2006/0013971 A1 * | 1/2006 | Chen et al. .................. 428/32.34 |
| 2006/0223962 A1 * | 10/2006 | Getman et al. ................... 528/10 |
| 2007/0145327 A1 | 6/2007 | Lortz et al. |
| 2007/0275257 A1 | 11/2007 | Muraguchi et al. |
| 2008/0075873 A1 * | 3/2008 | Tanaka et al. ................. 427/387 |
| 2008/0194855 A1 * | 8/2008 | Gottschalk-Gaudig et al. ............................. 556/407 |
| 2009/0005518 A1 | 1/2009 | Just et al. |
| 2011/0259240 A1 | 10/2011 | Jenkner et al. |
| 2012/0006228 A1 | 1/2012 | Scharfe et al. |
| 2012/0037040 A1 | 2/2012 | Standke et al. |
| 2013/0040078 A1 * | 2/2013 | Scharfe et al. ................. 106/481 |
| 2013/0167754 A1 * | 7/2013 | Wassmer et al. ......... 106/287.11 |

FOREIGN PATENT DOCUMENTS

| | | |
|---|---|---|
| EP | 1 413 451 | 4/2004 |
| JP | 08-034160 A | 2/1996 |
| JP | 11-348416 A | 12/1999 |
| JP | 2006-110770 A | 4/2006 |
| JP | 2006-321978 A | 11/2006 |
| JP | 2007-056240 | 3/2007 |
| JP | 2008-521980 A | 6/2008 |
| JP | 2013-535431 A | 9/2013 |
| TV | V1351384 B | 11/2011 |
| TW | 387003 | 4/2000 |
| WO | 01 05599 | 1/2001 |

* cited by examiner

METHODS FOR PRODUCING A DISPERSION CONTAINING SILICON DIOXIDE PARTICLES AND CATIONIZATION AGENT

The invention relates to a process for preparing a dispersion comprising silicon dioxide particles and cationizing agents, to the dispersion itself and to a coating slip obtainable therewith.

It is known to use silicon dioxide-containing aqueous dispersions for preparing coating slips for ink-accepting layers in the inkjet sector. Cationic polymers are added to these dispersions in EP-A-1013605, DE-A-10033054 or EP-A-1331254 to improve the quality, more particularly the waterfastness and ink density, of the resulting ink acception layers. Yet the addition of known cationic polymers can lead to an extreme increase in the viscosity particularly with highly filled dispersions, which are particularly desired because of the better formulatability of the resulting coating slips and for reasons of ecology (reduced water evaporation and energy requirements in drying) as well as economics, and make it impossible to process dispersions having a high filler content.

EP-A-1413451 discloses a method of preparing a media sheet for inkjet printing applications, wherein porous inorganic macroparticles and an organosilane reagent are reacted on a substrate. The inorganic macroparticles may be silicon dioxide particles. The organosilane reagent is an oligomer of the structure

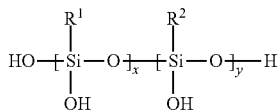

where x+y=4, $R^1$ and $R^2$ are each aminopropyl and the relative molecular mass is in the range from 270 to 550. This method is said to improve the permanence of printing inks.

Notwithstanding the advances made in the prior art, the processability of the dispersions at high solids content and improved print quality in the inkjet sector remain key parameters still in need of improvement.

The technical problem addressed by the present invention is therefore that of providing a dispersion which does not have the deficiencies of the prior art. A further object is to provide an improved coating slip of high solids content from this dispersion.

The invention provides a process for preparing a dispersion comprising silicon dioxide particles and cationizing agents, characterized in that
a) 50 to 75 parts by weight of water,
b) 25 to 50 parts by weight of silicon dioxide particles having a BET surface area of 30 to 500 m²/g and
c) 100 to 300 μg of cationizing agent per square meter of the BET surface area of the silicon dioxide particles are dispersed, wherein
  the cationizing agent is obtainable by reacting at least one haloalkyl-functional alkoxysilane, its hydrolysis products or condensation products and/or a mixture thereof with at least one aminoalcohol and a defined amount of water and optionally removing the resulting hydrolysis alcohol at least partly from the reaction mixture, wherein the haloalkyl-functional alkoxysilane has the general formula I $(R^1O)_{3-x-y}(R^2)_x Si[(R^3)_n CH_2 Hal]_{1+y}$ (I), where
  $R^1$ groups are the same or different and $R^1$ represents a hydrogen, a linear, branched or cyclic alkyl group having 1 to 8 carbon atoms or an aryl, arylalkyl or acyl group,
  $R^2$ groups are the same or different and $R^2$ represents a linear, branched or cyclic alkyl group having 1 to 8 carbon atoms or an aryl, arylalkyl or acyl group,
  $R^3$ groups are the same or different and $R^3$ represents a linear, branched or cyclic alkylene group having 1 to 18 carbon atoms,
  n is 0 or 1 and Hal represents chlorine or bromine,
  and x is 0, 1 or 2, y is 0, 1 or 2 and (x+y) is 0, 1 or 2,
  the aminoalcohol has the general formula II
  $[HO-(CH_2)_m-]_z N(R^4)_{3-z}$ (II), where
  $R^4$ groups are the same or different and $R^4$ represents a group comprising C1 to C16 atoms, m is an integer between 1 and 16 and z is 1, 2 or 3.

In what follows, the haloalkyl-functional alkoxysilane, its hydrolysis products or condensation products and/or a mixture thereof will be referred to as component A and the aminoalcohol as component B.

The reaction of component A and component B is carried out in the presence of a defined amount of water, or component A is reacted with component B followed by a hydrolysis in the presence of a defined amount of water, preferably component A, particularly of formula I has $R^1$ alkyl of 1 to 4 carbon atoms, acyl and $R^3$ a linear alkylene group of 1, 2, 3, 4, 5, 6, 7 carbon atoms, preferably of 2 carbon atoms.

Preferably usable haloalkyl-functional alkoxysilanes are 3-chloropropyltrimethoxysilane, 3-chloropropyltriethoxysilane, 3-chloropropyltripropoxysilane, chloropropylmethyldimethoxysilane, chloropropylmethyldiethoxysilane, chloropropyldimethylethoxysilane, chloropropyldimethylmethoxysilane, chloroethyltrimethoxysilane, chloroethyltriethoxysilane, chloroethylmethyldimethoxysilane, chloroethylmethyldiethoxysilane, chloroethyldimethylmethoxysilane, chloroethyldimethylethoxysilane, chloromethyltriethoxysilane, chloromethyltrimethoxysilane, chloromethylmethyldimethoxysilane, chloromethylmethyldiethoxysilane, chloromethyldimethylmethoxysilane, chloromethyldimethylethoxysilane, 2-chloroisopropyltris(methoxyethoxy)silane, 3-chloropropylcyclohexyldiethoxysilane, 3-chloroisobutyltrimethoxysilane, 3-chloroisobutyltriethoxysilane, 3-chloropropylcyclohexyldimethoxysilane, 3-bromoisopropyldiethylcyclohexoxysilane, 3-chloropropylcyclopentyldienethoxysilane, 3-bromoisobutyltrimethoxysilane, 3-chloroisobutylbis(ethoxyethoxy)methylsilane, 4-bromo-n-butyltriethoxysilane, 4-chloro-n-butyldiethoxycyclopentylsilane, 5-chloro-n-pentyltri-n-butoxysilane, 5-bromo-n-pentyltriethoxysilane, 4-bromo-3-methylbutyldimethoxyphenylsilane, 5-bromo-n-pentyltri-n-butoxysilane, 5-chloro-n-pentyltriethoxysilane, 6-chloro-n-hexylethoxydimethylsilane, 6-bromo-n-hexylpropyldipropoxysilane, 6-chloro-n-hexyldiethoxyethylsilane, 7-chloro-n-heptyltriethoxysilane, 7-chloroheptyldimethoxycycloheptylsilane, 7-bromo-n-heptyldiethoxycyclooctylsilane, 8-chloro-n-octyltriethoxysilane, 8-bromo-n-octyldimethylcyclohexoxysilane, 3-chloropropyldiethoxyphenylsilane, 3-chloropropylmethoxyethoxybenzylsilane, 3-bromopropyldimethoxybenzylsilane and/or their hydrolysis and/or homo- and/or co-condensation products or advantageously 1,4-chlorophenyltrimethoxysilane, 1,4-chlorobenzyltriethoxysilane and chloromethyl-p-methylphenyltrimethoxysilane and/or their hydrolysis and/or homo- and/or co-condensation products.

It may be particularly preferable to use 3-chloropropyltrimethoxysilane, 3-chloropropyltriethoxysilane, 3-chloropropylmethyldimethoxysilane, 3-chloropropylmethyldiethoxysilane, 3-chloropropyldimethylethoxysilane or 3-chloropropyldimethylmethoxysilane or a hydrolysis or condensation product of the aforementioned alkoxysilanes.

It is particularly advantageous to use components A and B in a molar ratio of 2:1 to 1:100, particularly 2:1 to 1:10, preferably 2:1 to 1:5 and more preferably about 1:1 to about 1:1.5, the molar ratio being based on the haloalkyl group of component A and the tertiary nitrogen of component B, although optionally a ratio of 1:1 is set first and subsequently about 0.2 of component B per batch, based on component A present, is additionally added in 1 to 4 batches.

In a particularly advantageous way to carry out the process, water is used in an amount of 0.5 to 500 mol of water per mol of silicon atoms present from component A, preferably in at least one of the hydrolysis steps 0.5 mol of water per mol of hydrolysable alkoxy group on the silane, while together it is preferable to use in particular from 0.5 to 25 mol of water and preferably from 5 to 25 mol of water per mol of silicon atoms, with regard to component A used, more preferably from 10 to 25 mol of water per mol of the silicon atoms and more particularly from 12 to 25 mol of water per mole of silicon atoms.

Depending on how the process is carried out, it will prove to be advantageous to perform the reaction in the presence of a solvent, more particularly an alcohol, preferably in the presence of the alcohol formed in the course of the hydrolysis of the alkoxysilane and more preferably in the presence of ethanol, methanol, n-propanol or isopropanol. The solvent added is suitably removed from the system in the course of the removal of the hydrolysis alcohol formed in the course of the reaction. The hydrolysis alcohol formed in the course of the reaction is removed essentially completely, preferably by distillation, more particularly while the reaction is still being carried out. In a particularly preferred way to carry out the process, the amount of hydrolysis alcohol and water removed by distillation, say, can be compensated in the azeotropic mixture by additional addition of water.

Volatile solvents, such as an added solvent and/or the alcohol formed by hydrolysis in the course of the reaction, i.e. groups possibly hydrolysable to volatile solvent, more particularly hydrolysis alcohol, are removed down to a level in the overall composition of below 12% by weight to 0% by weight, preferably by distillation according to methods familiar to a person skilled in the art. A composition shall be considered free of solvents when the level of solvents in the overall composition has been reduced to below 10% by weight to 0% by weight, more preferably to below 5% by weight, even more preferably to below 2% by weight to 0.0001% by weight, more particularly 1 to ≤0.5% by weight and preferably 0.5 to ≤0.1% by weight, volatile solvent being removable by distillation, in particular under reduced pressure in the range from 1 to 1000 mbar, preferably in the range from 80 to 300 mbar and more preferably in the range from 80 to 180 mbar, during the reaction and/or thereafter. Suitably, however, the pressure can also be reduced from ambient pressure to a reduced pressure in the course of the reaction. The distillation can be carried out batchwise or else continuously via distillation column, thin film evaporator and also further apparatus familiar to a person skilled in the art. A distillation is preferably carried on until just water is still detectable at the top of the separating column. Water distilled off can be replenished by renewed addition of water. At the end of the distillation, the desired final concentration for the solution can be established by adding further water.

The reaction is preferably carried out at a pressure in the range from 1 mbar to 100 bar, more preferably around about 1 mbar to 1.1 bar, even more preferably at ambient pressure (standard pressure), and at a temperature of 20 to 150° C., preferably between 40 to 120° C., more preferably between 60 to 100° C. and more particularly in the range from 80 to 95° C.

It may prove to be advantageous to add a hydrolysis and/or condensation catalyst, for example an organic or inorganic acid, such as formic acid, acetic acid, propionic acid, citric acid, hydrogen chloride, as a gas, concentrated or aqueous hydrochloric acid, boric acid, nitric acid, sulphuric acid or phosphoric acid. Accordingly, an organic or inorganic acid can also be added at any time to adjust the pH of the composition or reaction mixture.

It may further be preferable to use metal oxides, preferably metal oxides having hydroxyl groups capable of condensation. These are in particular silica, pyrogenous silicic acid, precipitated silicic acid, silicates, boric acid, titanium dioxide, aluminium oxide, aluminium oxide hydrate, ATH (aluminium trihydroxide, $Al(OH)_3$), magnesium hydroxide ($Mg(OH)_2$), cerium oxide, yttrium oxide, calcium oxide, iron oxides, zirconium oxide, hafnium oxide, boron oxide, gallium oxide, indium oxide, tin oxide, germanium oxide and also corresponding hydroxides and oxide hydrates and also mixtures of at least two of the aforementioned compounds with each other.

Volatile solvents or groups hydrolysable to volatile solvents are to be understood as meaning alcohols, such as methanol, ethanol, isopropanol, n-propanol, and alkoxy groups which hydrolyse to alcohols, acyloxy-containing radicals and also the acetic or formic acid formed by hydrolysis, or else aryloxy groups which can form phenols and also glycols and also partially etherified glycols, such as ethylene glycol, diethylene glycol or methoxyethanol, which are either added to the formulation or form by hydrolysis of their silyl esters.

The invention further provides a process for preparing an advantageous dispersion comprising silicon dioxide particles and cationizing agents, wherein
a) 50 to 75 parts by weight of water,
b) 25 to 50 parts by weight of silicon dioxide particles having a BET surface area of 30 to 500 $m^2/g$ and
c) 100 to 300 μg of one or more quaternary, aminofunctional, organosilicon compounds per square meter of the BET surface area of the silicon dioxide particles are dispersed, wherein the cationizing agent comprises one or more quaternary, aminoalcohol-functional, organosilicon compounds of the general formula III and/or condensation products thereof, wherein
$R_u$ and $R_v$ are each independently of each other an alkyl group having 2 to 4 carbon atoms, m is 2 to 5 and n is 2 to 5.

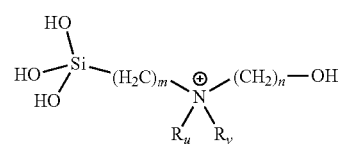

III

Particular preference is given to an embodiment where u=v=Me, m=3 and n=2.

The condensation products of the quaternary, aminoalcohol-functional, organosilicon compounds can have linear, branched and/or cyclic structures or structural regions with M-, D-, T-structures. According to $^{29}Si$ NMR spectroscopy, these are, in addition to preferably 0.5 to 5%, more preferably 1% to 3%, of monomeric structures, preferably 3% to 15%, more preferably 5 to 10%, of M-structures and preferably in each case 35 to 60%, more preferably 40 to 55%, of D-structures. A definition of M- D-, T-structures may be found in Walter Noll, Chemie and Technologie der Silicone, 1968, Verlag Chemie GmbH, Weinheim, chapter 1.

The quaternary, aminoalcohol-functional, organosilicon compounds further preferably have a number average molecular weight $M_n$ in the range from 500 to 5000 and more preferably in the range from 1000 to 2500.

The proportion of quaternary, aminoalcohol-functional, organosilicon compounds in the aqueous solution is preferably in the range from 30% to 60% by weight and more preferably in the range from 40% to 50% by weight.

Silicon Dioxide Particles

The silicon dioxide particles used comprise amorphous silicon dioxide particles. The silicon dioxide particles bear condensable groups, for example OH groups, on their surface. Mixed oxides with silicon dioxide as a constituent or metal oxide particles enveloped by silicon dioxide shall also be comprehended. Amorphous silicon dioxide particles are obtainable for example via electric arc processes, plasma processes, wet-chemical processes, such as precipitation and gelling processes, and also by pyrogenous processes. The silicon dioxide particles preferably comprise pyrogenously produced particles. Pyrogenously is to be understood as referring to the hydrolysis or oxidation of silicon compounds in the gas phase in a flame, generally produced by the reaction of hydrogen and oxygen. This initially produces finely divided, nonporous primary particles, which in the further course of the reaction can grow together into aggregates which can further combine into agglomerates.

The BET surface area of the silicon dioxide particles used can vary over a wide range, from 30 to 500 $m^2/g$. However, it was found that the use of pyrogenously produced silicon dioxide particles having a BET surface area of 200 $m^2/g$ or more and particularly those having a BET surface area in the range from 240 to 330 $m^2/g$ leads to dispersions that have particularly good properties in the inkjet sector.

Further Materials Used to Produce the Dispersion

The process according to the invention may additionally utilize one or more basic substances. In general, these can be amines and/or salts thereof. Acids can be used to further improve the stability of the dispersion according to the invention. Suitable acids can be hydrochloric acid, C1-C4 carboxylic acids, C1-C4 hydroxy carboxylic acids or C1-C4 dicarboxylic acids. The acid will normally be added in an amount so as to produce a dispersion pH in the range from 2 to 6, preferably in the range from 3 to 5 and more preferably in the range from 3.5 to 4.5. However, it may be noted that stable dispersions are obtainable even without addition of an acid. Furthermore, organic solvents, bactericides and/or fungicides can be used in the production of the dispersion.

In general, the dispersion is prepared by first using a minimal energy input, for example via a dissolver, to prepare a pre-dispersion by adding silicon dioxide particles to the liquid components of the dispersion. A second step then comprises the actual dispersing, for which the energy input is higher than in the first step. Suitable dispersing assemblies are known to a person skilled in the art. A rotor-stator assembly may be mentioned by way of example.

The invention further provides a dispersion obtainable via the process according to the invention. This dispersion has a mean particle diameter determined via dynamic light scattering of preferably 120 to 250 nm and more preferably of 130 to 180 nm.

In one preferred embodiment, the dispersion according to the invention contains 35% to 40% by weight of pyrogenously produced silicon dioxide particles having a BET surface area in the range from 250 $m^2/g$ to 350 $m^2/g$ and the mean particle diameter determined via dynamic light scattering is in the range from 130 to 180 nm.

Coating Slip

The invention further provides a coating slip, this coating slip containing the dispersion according to the invention and at least a binder.

Useful binders include for example: polyvinyl alcohol, partially or fully hydrolysed, and also cationized polyvinyl alcohol having a primary, secondary or tertiary amino group or a tertiary ammonium group on the main chain or on the side chain. Also combinations of these polyvinyl alcohols with one another and polyvinylpyrrolidones, polyvinyl acetates, silanized polyvinyl alcohols, styrene-acrylate latices, styrene-butadiene latices, melamine resins, ethylene-vinyl acetate copolymers, polyurethane resins, synthetic resins such as polymethyl methacrylates, polyester resins (e.g. unsaturated polyester resins), polyacrylates, modified starch, casein, gelatin and/or cellulose derivatives (e.g. carboxymethylcellulose). It may be preferable to use polyvinyl alcohol or cationized polyvinyl alcohol.

The coating slip may further also contain one or more other pigments such as calcium carbonates, sheet silicates, aluminosilicates, plastic pigments (e.g. polystyrene, polyethylene, polypropylene), silica gels, aluminium compounds (e.g. aluminium sols, colloidal aluminas and their hydroxy compounds, such as pseudoboehmites, boehmites, aluminium hydroxide), magnesium oxide, zinc oxide, zirconium oxide, magnesium carbonates, kaolin, clay, talc, calcium sulphate, zinc carbonate, satin white, lithopone, zeolites.

The coating slip may have a mixed oxide particle content between 10% and 60% by weight. It may preferably be above 15% by weight and more preferably above 25% by weight.

The waterfastness of the binder system and hence of the coating can be increased using crosslinkers such as zirconium oxides, boric acid, melamine resins, glyoxal and isocyanates and other molecules that bind the molecular chains of the binder system together.

It is further possible to use auxiliaries such as optical brighteners, defoamers, wetting agents, pH buffers, UV absorbers and viscosity aids.

The coating slip according to the invention preferably has a solids content in the range from 10% to 30% by weight and more preferably in the range from 15% to 30% by weight.

The invention further provides for the use of the dispersion according to the invention and the coating slip according to the invention for coating ink-accepting inkjet media.

The invention further provides an ink-accepting medium comprising an ink acception layer, wherein the ink acception layer comprises the coating slip according to the invention and a carrier. The carrier used can be for example paper, coated paper, resin films, such as a polyester resin, including polyethylene terephthalate, polyethylene naphthalate, a diacetate resin, a triacetate resin, an acrylic resin, a polycarbonate resin, a polyvinyl chloride, a polyimide resin, cellophane, celluloid and a glass plate.

Preference is given to so-called photobase papers, i.e. papers to which one or more layers of polyethylene film have been applied front and/or back. Also polyester film, PVC film or pre-coated papers.

The ink-accepting medium according to the invention also includes media wherein the ink-accepting layer consists of two or more coating layers of the same type or other layers. The coating slip according to the invention can only be present in one or more layers. For instance, further ink-absorptive coatings can additionally be present. Furthermore, one or more polymer layers (e.g. polyethylene) can be applied to the substrate and/or to the coating according to the invention in order that the mechanical stability and/or the gloss in the coating may be enhanced (e.g. photobase paper, lamination).

The carriers can be transparent or opaque. The thickness of the carrier is not limited, preferably thicknesses between 50 and 250 μm are used.

To produce the ink-accepting medium, the coating slip can be applied to the carrier and dried. The coating slip can be applied using any customary method of application, such as roll application, blade coating, air brush, blade (profiled, smooth, slot), cast coating, film press, size press, curtain coating and slot die application and combinations thereof. Preference is given to using processes that permit very homogeneous coating, for example cast coating, curtain coating and slot die application.

The coated substrate can be dried using any customary process such as air or convection drying (e.g. hot air duct), contact or conduction drying, energy ray drying (e.g. infrared and microwaves).

EXAMPLES

Methods of Determination

Hydrolysable chloride was titrated potentiographically with silver nitrate (for example Metrohm type 682 silver rod as indicator electrode and Ag/AgCl reference electrode or other suitable reference electrode). Total chloride content by Wurtzschmitt digestion. For this purpose, the sample is digested with sodium peroxide in a Wurtzschmitt bomb. After acidification with nitric acid, chloride is measured potentiographically with silver nitrate, as above.

In a complete reaction of the chloroalkyl function with tertiary amines, the analytical values for hydrolysable chloride and total chloride are identical and therefore a measure of the completeness of the reaction, since the sum total of salt-like chloride (amine hydrochloride) and covalently bonded chlorine (chloroalkyl function) is determined by total chloride and exclusively salt-like chloride or chloride which can be eliminated with water (amine hydrochloride in the present case) is determined by hydrolysable chloride. At the beginning of the reaction, the value of hydrolysable chloride is zero and increases at complete conversion to the value which is measured for total chloride. Therefore, these analyses are very useful in addition to $^1$H and $^{13}$C NMR spectroscopy for reaction policing.

The alcohol content after hydrolysis is determined by gas chromatography. For this purpose, a sample of a defined quantity is hydrolysed with sulphuric acid (5 g of sample, 25 ml of $H_2SO_4$, w=20%). 75 ml of distilled water are added. Thereafter, neutralization is effected with aqueous sodium hydroxide solution and a steam distillation is carried out. Internal standard 2-butanol.

Nitrogen determination, organically bound, ammonium etc. organically bound nitrogen can be converted into ammonium via Kjeldahl digestion and, after addition of sodium hydroxide solution, determined acidimetrically as ammonia. Procedure: up to 5 g of sample are heated with 10 ml of sulphuric acid (conc.) and a Kjeldahl tablet (Merck 1.15348) until the digestion solution is light-coloured and, apart from any precipitated silicic acid, clear. The digestion vessel is connected to the distillation apparatus and ammonia released by aqueous sodium hydroxide solution addition (27%) is distilled over into the receiving vessel. The ammonia content is titrated with sulphuric acid ($c(H_2SO_4)$=0.05 mol/l or 0.005 mol/l) under boric acid addition (2%). V=consumption of sulphuric acid in ml, c=concentration of sulphuric acid in mol/l, z=equivalent number of sulphuric acid=2, E=sample weight in mg Calculation: $N[\%]=(100 \cdot V \cdot c \cdot z \cdot 14.01)/E$ $SiO_2$ is determined following decomposition with sulphuric acid and Kjeldahl catalyst by determining the weight of precipitated $SiO_2$. Procedure: the 1 g sample is admixed with a Kjeldahl tablet (e.g. Merck No. 15348) and 20 ml of sulphuric acid (conc.) in a 250 ml glass beaker. The solution is gradually heated. The organic constituents are oxidized until the digestion solution remains clear and light-coloured with fuming sulphuric acid. After cooling and careful diluting to about 200 ml, the silicic acid precipitated in the process is filtered off on a white ribbon filter. The filter is washed with water until the wash liquor pH is >4, then dried and ashed in a platinum crucible. The residue is calcined at 800° C. and weighed out. After fuming off with hydrofluoric acid (conc.), the residue is again calcined at 800° C. and weighed out. m=weight difference before and after heating with hydrofluoric acid in g; E=sample weight in g Calculation: $SiO_2[\%]=100 \cdot m/E$ Following are the DIN standards which were applied to determine the parameters mentioned: solids content to DIN 38409-1 (1987-01-00), refractive index to DIN 51423 (2010-02-00), density to DIN 51757 (1994-04-00), viscosity to DIN 53015 (2001-02-00), colour number to DIN EN ISO 6271 (2005-03-00) and cloudiness to DIN EN ISO 7027 (2000-04-00).

Example 1

Preparation of a Cationizing Agent from Chloropropyltriethoxysilane (CPTEO) and N,N-dimethylethanolamine A 4 l four-neck flask is initially charged with 1283.0 g of CPTEO (5.328 mol) and 160.0 g of ethanol. At RT 143.9 g of completely ion-free water (1.5 mol of H2O/mol of Si) are added dropwise during 16 min. In the process, the pot temperature rises to about 40° C.

Then, 570.5 g (6.400 mol) of dimethylethanolamine are added during 6 min under stirring. In the process, the pot temperature rises from 40° C. to about 48° C. This is followed by refluxing (pot temperature about 85° C.) for about 45 min.

At standard pressure, 1706.6 g of water/ethanol/dimethylethanoldiamine are distilled off during about 6 h. During this period, 2038.3 g of water are added in seven portions under stirring. After about 3 h distillation, altogether 432.4 g of completely ion-free water were introduced in 3 portions. The pot sample then exhibits good solubility in completely ion-free water.

During 1.7 h, 529.4 g of water/ethanol/dimethylethanoldiamine mixture are distilled off at a pot temperature of 50° C. to 55° C. and an absolute pressure of about 140 mbar. At the end of the distillation, 560.17 g of completely ion-free water are added under stirring to obtain a slightly cloudy/slightly yellowish liquid of low viscosity. Yield: 2521.7 g.

The physicochemical data of the cationizing agent from Example 1 are given in Table 1.

$^1$H and $^{13}$C NMR: purity of target compound about 95.8 mol %. 4.2 mol % of free dimethylethanolamine. No evidence of transesterification of aminoethanol group to SiOR.

$^{29}$Si NMR: 1% of Si silane, 7% of Si M-structures, 45% of Si D-structures, 47% of Si T-structures

Examples 2

Preparation of Dispersions D1 to D3

Dispersion Examples D1-D3 hereinbelow were developed subject to the proviso that the dispersions shall be usable as thin liquids and have similar performance in papercoating with regard to pore structure and pore volume. The average aggregate size in the dispersion, as measured using dynamic light scattering, has transpired to be a measure of the porosity of the coating. Within a system, higher fill levels during dispersing lead to a reduction in the average particle size. The examples show that the use of the silane system according to the invention provides very high fill levels combined with retention of the desired aggregate size.

D1: Dispersion from AEROSIL® 300 Silicon Dioxide and Polydiallyldimethylammonium Chloride (p-DADMAC) (Comparative Example)

To 1350 g of completely ion-free water are added 60 g of p-DADMAC. Then, 320 g of AEROSIL® 300 are stirred in by means of a dissolver at 1500 to 4000 rpm during 40 min and subsequently further pre-dispersed at 2000 rpm for 5 min. Thereafter, a rotor-stator disperser is used at 15 000 rpm with cooling (<30° C.) for 30 minutes' dispersing. Finally, the dispersion is filtered through a 500 µm sieve.

D2: Dispersion from AEROSIL® 300 Silicon Dioxide and N-butylaminopropyltrimethoxysilane (Dynasylan® 1189) (Comparative Example)

425 g of AEROSIL® 300 are stirred into 1200 g of completely ion-free water during 30 min using a dissolver at 1500 to 4000 rpm and subsequently further pre-dispersed at 2000 rpm for five minutes. Thereafter, a rotor-stator disperser is used at 15 000 rpm with cooling (<30° C.) for 10 mins' dispersing.

This is followed by further stirring with the dissolver at 2000 rpm and the addition, during 5 min, of a mixture of 21.3 g of Dynasylan® 1189, 67 g of methanol and 20 g of formic acid (50 percent solution in water), followed by a further 60 minutes of final dispersion and reaction completion in the rotor-stator system at 5000 rpm at 60° C. Finally, the dispersion is cooled down and filtered through a 500 µm sieve.

D3: Dispersion from AEROSIL® 300 Silicon Dioxide and the Cationizing Agent from Example 1 (Inventive)

428 g of AEROSIL® 300 are stirred into a mixture of 805 g of completely ion-free water and 47.4 g of the solution of Example 1 during 17 min using a dissolver at 1500 to 5000 rpm and further dispersed at 2000 rpm for 10 minutes. Subsequently, a rotor-stator disperser (Kinematica Polytron PT6100) is used at 10 000 rpm for 30 mins' dispersing. Finally, the dispersion is filtered through a 500 µm sieve.

The physicochemical data of dispersions D1-D3 are given in Table 2.

Examples 3

Preparation of Dispersions D4-D6

Dispersion Examples D4-D6 show, irrespective of the particle diameter parameter, which solids content is maximally possible with the respective cationizing additive. The dispersions, as expected, have very high viscosities, but are still liquid and processable.

D4: Dispersion from AEROSIL® 300 Silicon Dioxide and Polydiallyldimethylammonium Chloride (p-DADMAC) (Comparative Example)

To 1190 g of completely ion-free water are added 60 g of p-DADMAC. Then, 320 g of AEROSIL® 300 are stirred in by means of a dissolver at 1500 to 4000 rpm and subsequently further pre-dispersed at 2000 rpm for five minutes. Thereafter, a rotor-stator disperser is used at 15 000 rpm with cooling (<30° C.) for ten minutes' dispersing. Finally, the dispersion is filtered through a 500 µm sieve.

D5: Dispersion from AEROSIL® 300 Silicon Dioxide and N-butylaminopropyltrimethoxysilane (Dynasylan® 1189) (Comparative Example)

1035 g of water are initially charged and 21.2 g of Dynasylan® 1189 are stirred into the water. After a hydrolysis time of 30 min, the initially charged solution is adjusted to pH 4.2 with 63.7 g of acetic acid (25 percent by weight solution in water). Then, 423.9 g of AEROSIL® 300 are stirred in using a dissolver at 1500 to 4000 rpm and subsequently further pre-dispersed for a period of five minutes at 2000 rpm. Thereafter, a rotor-stator disperser is used at 10 000 rpm with cooling (<30° C.) for 30 minutes of final dispersion. Finally, the dispersion is filtered through a 500 µm sieve.

D6: Dispersion from AEROSIL® 300 Silicon Dioxide and Solution from Example 1 (Inventive)

557 g of AEROSIL® 300 are stirred into a mixture of 885 g of completely ion-free water and 58 g of the solution from Example 1 using a dissolver at 1500 to 5000 rpm and further dispersed at 2000 rpm for 10 minutes. Subsequently, a rotor-stator disperser (Kinematica Polytron PT6100) is used at 10 000 rpm for 30 minutes' dispersing. Finally, the dispersion is filtered through a 500 µm sieve.

The physicochemical data of dispersions D4-D6 are given in Table 3.

Examples 4

Preparation of Dispersions D7-D10

In addition to AEROSIL® 300 (BET surface area about 300 m²/g), inventive dispersions can also be prepared on the basis of other AEROSIL® types. To this end, the AEROSIL® powder is stirred with a dissolver at 1500 to 5000 rpm into a mixture of 885 g of completely ion-free water and the corresponding amount of the cationizing agent from Example 1 and further dispersed at 2000 rpm for 10 minutes. Thereafter, a rotor-stator disperser (Kinematica Polytron PT6100) is used at 10 000 rpm for 30 minutes' dispersing. Finally, the dispersion is filtered through a 500 µm sieve. Materials and quantities used and also physicochemical data of dispersions D7-D10 are shown in Table 4.

Examples

Preparation of Coating Slips S1-S3

S1: In each case, a 12 percent by weight solution of PVA 235 polyvinyl alcohol from Kuraray Europe is added to dispersion D1, and stirred in for 10 minutes, by means of a dissolver at 500 rpm. Sufficient PVA 235 is added for a ratio of silicon dioxide to PVA (dry) of 4:1 (or 5:1 for S2 and S3). For viscosity adjustment, sufficient water is added to establish the solids content reported in the table. Thereafter, a 7 percent by weight solution of boric acid in water is added. The amount of boric acid is equal to 12.5% by weight of the amount of polyvinyl alcohol. Finally, the glyoxal-containing composition "Cartabond TSI" from Clariant is added. The amount corresponds to 4.8% by weight of the amount of polyvinyl alcohol.

The viscosity of the inkjet coating slip is measured with a Brookfield viscometer after 24 h.

S2 and S3 are prepared similarly to S1, except that the respective dispersion D2 and D3 is used. The solids contents and the viscosities of the coating slips are reported in Table 5.

Examples

Preparation of Inkjet Coatings

The coating slips S1 to S3 are each applied to photobase paper (thickness 300 μm) using a profiled doctor bar. The wet-film thickness of each coating slip is chosen to achieve a comparable coat weight.

The coating is dried at 105° C. for 8 minutes. A uniform coat weight of 22 g/m² is achieved. The coated papers are printed on a Canon PIXMA iP6600D inkjet printer at very high resolution. The assessment of the print results is reported in Table 6.

The advantages of the coating slip according to the invention reside in improved processability compared with the prior art, reduced environmental impact due to the absence of VOC-containing constituents, and a faster coatability due to the lower water content. At the same time, no disadvantages are incurred with regard to image intensity and image quality.

TABLE 1

Physicochemical data of cationizing agent from Example 1 determination

| total N | % by weight | 2.9 |
|---|---|---|
| total chloride | % by weight | 7.4 |
| hydrolysable chloride | % by weight | 7.0 |
| SiO$_2$ | % by weight | 12.5 |
| solids content | % by weight | 47.5 |
| ethanol (after hydrolysis) | % by weight | <0.1 |
| pH | | 8.6 |
| refractive index (20° C.) | | 1.4146 |
| density (20° C.) | g/cm³ | 1.126 |
| viscosity (20° C.) | mPas | 12.3 |
| flash point | ° C. | >95 |
| colour number | mg Pt—Co/l | 55 |
| cloudiness | TU/F | 0.36 |

TABLE 2

Physicochemical data of dispersions D1-D3

| | | comparative | | inventive |
|---|---|---|---|---|
| | | D1 | D2 | D3 |
| solids content[a] | % by weight | 20.0 | 25.0 | 30.0 |
| mean particle ø[b] | nm | 157 | 154 | 145 |
| viscosity[c] | mPas | 47 | 80 | 96 |
| processing time | min | 75 | 105 | 57 |

TABLE 3

Physicochemical data of dispersions D4-D6

| | | comparative | | inventive |
|---|---|---|---|---|
| | | D4 | D5 | D6 |
| solids content[a] | % by weight | 23.0 | 30 | 39 |
| mean particle ø[b] | nm | 132 | 125 | 114 |
| viscosity[c] | mPas | 5600 | 2800 | 5380 |

TABLE 4

Materials used, physicochemical data of dispersions D7-D10

| | | D7 | D8 | D9 | D10 |
|---|---|---|---|---|---|
| silicon dioxide BET surface area | m²/g | 150 | 200 | 255 | 255 |
| amount used | g | 472 | 375 | 335 | 420 |
| cationizing agent from Example 1 | g | 26.1 | 27.7 | 31.5 | 39.5 |
| solids content[a] | % by weight | 35.0 | 30.2 | 28.0 | 32.6 |
| mean particle ø[b] | Nm | 159 | 150 | 145 | 140 |
| viscosity[c] | mPas | 68 | 58 | 45 | 125 |

For Tables 2-4:
[a] after drying at 125° C. to constant weight;
[b] mean particle diameter by dynamic light scattering (Horiba LB-500);
[c] at 1000 s$^{-1}$; 23° C.;

TABLE 5

Solids contents, viscosities of coating slips S1-S3

| | | comparative | | inventive |
|---|---|---|---|---|
| | | S1 | S2 | S3 |
| from dispersion | | D1 | D2 | D3 |
| solids content | % by weight | 17.5 | 22.6 | 24.3 |
| viscosity[d] | mPas | 3680 | 5350 | 3200 |

[d] viscosity (Brookfield) at 100 rpm and 20° C.; measured after 24 h

TABLE 6

Assessment[e] of print results

| | S1 | S2 | S3 |
|---|---|---|---|
| colour intensity | 2 | 2 | 2 |
| resolution | 2.5 | 2 | 2 |
| ink flow[f] | 1.5 | 1 | 1 |
| colour shift | 1.75 | 1.5 | 1.5 |
| gloss[g] | 37 | 39.3 | 42.7 |

[e] best rating 1, worst rating 6;
[f] bleeding;
[g] at 60° angle of view

The invention claimed is:

1. A process for preparing a dispersion comprising silicon dioxide particles and a cationizing agent, the process comprising:
mixing a) 50 to 75 parts by weight of water, b) 25 to 50 parts by weight of silicon dioxide particles having a BET surface area of 30 to 500 m²/g, and c) an amount based on 100 to 300 μg of a cationizing agent per square meter of the BET surface area of the silicon dioxide particles, to obtain a dispersion, wherein the amount of component c) is determined based on the amount of component b) as follows:

the amount of component b) in terms of grams is multiplied by its BET surface area to obtain a total BET surface area in terms of m², and then the total BET surface area is multiplied by 100 to 300 μg/m², wherein the cationizing agent is obtained by a process comprising reacting a haloalkyl-functional alkoxysilane, a hydrolysis product thereof, a condensation product thereof, or any mixture thereof with an aminoalcohol and water, and optionally removing, at least partly, any resulting hydrolysis alcohol from the reaction mixture, wherein the haloalkyl-functional alkoxysilane has formula (I):

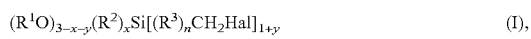

wherein:

each $R^1$ group is independently a hydrogen, a linear, branched or cyclic alkyl group having 1 to 8 carbon atoms or an aryl, arylalkyl, or acyl group;

each $R^2$ group is independently a linear, branched or cyclic alkyl group having 1 to 8 carbon atoms or an aryl, arylalkyl, or acyl group;

each $R^3$ group is independently a linear, branched or cyclic alkylene group having 1 to 18 carbon atoms;

n is 0 or 1;

Hal is chlorine or bromine;

x is 0, 1 or 2;

y is 0, 1, or 2; and (x+y) is 0, 1, or 2, the aminoalcohol has formula (II):

wherein:

each $R^4$ group is independently a group having C1 to C16 atoms;

m is an integer between 1 and 16; and z is 1, 2, or 3.

2. The process of claim 1, wherein the haloalkyl-functional alkoxysilane is chloropropyltriethoxysilane and the aminoalcohol is selected from the group consisting of N,N-dimethylethanolamine, N,N-diethylethanolamine, N-methyldiethanolamine, N-ethyldiethanolamine, and triethanolamine.

3. The process of claim 2, wherein the aminoalcohol is N,N-dimethylethanolamine.

4. The process of claim 2, wherein the aminoalcohol is N,N-diethylethanolamine.

5. The process of claim 2, wherein the aminoalcohol is N-methyldiethanolamine.

6. The process of claim 2, wherein the aminoalcohol is N-ethyldiethanolamine.

7. The process of claim 2, wherein the aminoalcohol is triethanolamine.

8. The process of claim 1, wherein the silicon dioxide particles are pyrogenously produced silicon dioxide particles.

9. The process of claim 8, wherein the pyrogenously produced silicon dioxide particles have a BET surface area of 200 to 500 m²/g.

10. The process of claim 1, wherein the dispersing is effected in the presence of a basic or acidic substance or a salt thereof.

11. The process of claim 1, wherein the dispersing is effected with a rotor-stator assembly.

12. A dispersion obtained by the process of claim 1.

13. The dispersion of claim 12, wherein the average particle diameter determined via dynamic light scattering is in the range from 120 to 250 nm.

14. The dispersion of claim 12, comprising from 35% to 40% by weight of pyrogenously produced silicon dioxide particles having a BET surface area in the range from 250 m²/g to 350 m²/g and the mean particle diameter determined via dynamic light scattering is in the range from 130 to 180 nm.

15. A coating slip, comprising:

the dispersion of claim 12; and a binder.

16. A process for coating an ink-accepting inkjet media, the process comprising:

contacting the dispersion of claim 12 with an ink-accepting inkjet media.

17. A process for preparing a dispersion comprising silicon dioxide particles and a cationizing agent, the process comprising:

mixing a) 50 to 75 parts by weight of water, b) 25 to 50 parts by weight of silicon dioxide particles having a BET surface area of 30 to 500 m²/g, and c) an amount based on 100 to 300 μg of a cationizing agent per square meter of the BET surface area of the silicon dioxide particles, wherein the amount of component c) is determined based on the amount of component b) as follows:

the amount of component b) in terms of grams is multiplied by its BET surface area to obtain a total BET surface area in terms of m², and then the total BET surface area is multiplied by 100 to 300 μg/m², to obtain a dispersion, wherein the cationizing agent comprises a quaternary, aminoalcohol-functional, organosilicon compound of formula (III), a condensation products thereof, or a mixture thereof,

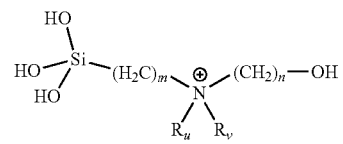

wherein:

$R_u$ and $R_v$ are each independently an alkyl group having 2 to 4 carbon atoms;

m is 2 to 5; and n is 2 to 5.

18. The process of claim 17, wherein the quaternary, aminoalcohol-functional, organosilicon compound has a number average molecular weight $M_n$ in the range from 500 to 5000.

19. The process of claim 17, wherein the quaternary, aminoalcohol-functional, organosilicon compound is in the form of an aqueous solution having a concentration of 20% to 60% by weight of the quaternary, aminoalcohol-functional, organosilicon compound.

* * * * *